March 6, 1962 R. BOYER 3,023,924
FILLER CAP FOR MASTER CYLINDER
Filed March 2, 1955 3 Sheets-Sheet 1

INVENTOR.
RAYMOND BOYER
BY John A. Young
ATTORNEY

March 6, 1962  R. BOYER  3,023,924
FILLER CAP FOR MASTER CYLINDER

Filed March 2, 1955  3 Sheets-Sheet 2

INVENTOR.
RAYMOND BOYER
BY John A. Young
ATTORNEY ated Mar. 6, 1962

3,023,924
FILLER CAP FOR MASTER CYLINDER
Raymond Boyer, South Bend, Ind., assignor to The
Bendix Corporation, a corporation of Delaware
Filed Mar. 2, 1955, Ser. No. 491,584
5 Claims. (Cl. 220—39)

This invention relates to a filler cap for a master cylinder reservoir.

Master cylinders in hydraulic brake systems are provided with removable means received in an opening located at a suitable height above the fluid level in the reservoir of the master cylinder.

The purpose of this means is twofold:

First, it is a removable plug for an opening which provides access to the reservoir and serves as an inlet for additional hydraulic fluid. This additional fluid is poured into the reservoir during bleeding of the brake and also replaces fluid lost owing to leakage in the system.

Secondly, the removable means serves to vent air into the reservoir as fluid is withdrawn during brake usage. When fluid is displaced from the master cylinder reservoir, a vacuum develops and this must be compensated for by venting air into the reservoir, otherwise, air is sucked into the hydraulic lines via the piston. If this latter condition should occur, then air bubbles in the fluid cause a "spongy" pedal, thus impairing the property of the fluid as a force-transmitting medium. A further factor to consider is prevention of loss of brake fluid through the venting means when the fluid in the reservoir splashes under the influence of road shock. In this case, it is desirable to construct a baffle which serves as a barrier between the reservoir and the vent but does prevent redraining of fluid that should work its way beyond the baffle. It is necessary that all filler plugs should effectively shield the reservoir from water, dirt, grease, etc. that has deleterious effect in the brake system.

It is an object of this invention to provide a filler cap in which all of the components of the filler cap consist of stamped parts so that the construction of the filler cap lends itself to large scale commercial production.

One of the construction features of the present invention is minimization in the number of parts of the cap. Many prior art devices with which I am acquainted, require provision of an individual baffle which must be separately fitted into the filler cap. I propose to eliminate this source of cost and inconvenience by simply forming a one piece plug out of a single stamping. This plug has a transverse baffle formed integrally with the threaded cylindrical portion of the plug. A second stamping, consisting of a cap, may then be suitably fastened to the plug to make up the complete article. From the foregoing, it will be apparent that I have not only reduced the total number of components of the article but also reduced the cost of their individual manufacture and method of assembly. This construction is a material advance over prior filler caps wherein the baffle was formed as a separate piece and then attached to the plug.

A further object of the invention is to obtain a derivable connection between the portion of the filler cap which is turned by an appropriate tool, and that portion of the filler cap which is threadedly received in an opening in the reservoir. Thus, there is eliminated any possibility of stripping the interconnection between the filler cap and plug with the result that the plug can always be removed from the opening in the reservoir.

A further object of the invention is to reliably confine the fluid in the hydraulic reservoir and prevent leakage through the filler cap by splashing of the fluid resulting from jarring of the master cylinder.

One of the principal features of the invention is that air may be vented to the hydraulic reservoir as liquid is withdrawn; yet, foreign matter is reliably trapped in the filler cap in a manner preventing its passage into the reservoir.

My over-all object is to realize the foregoing objects and features in a device which is characterized by reliability in performance and economy in manufacture.

Other features and objects of the invention will become apparent from a consideration of the following description, taken in connection with the accompanying drawings wherein.

Figure 5:
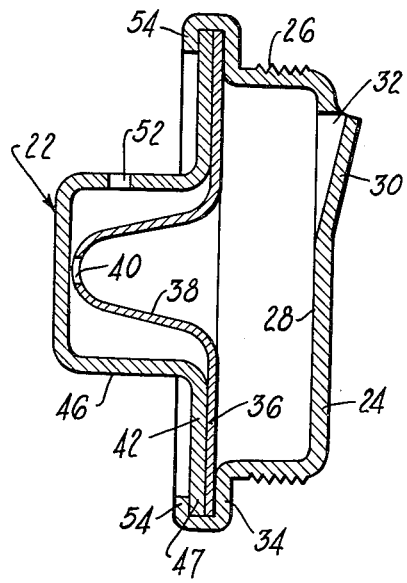
Figure 6:
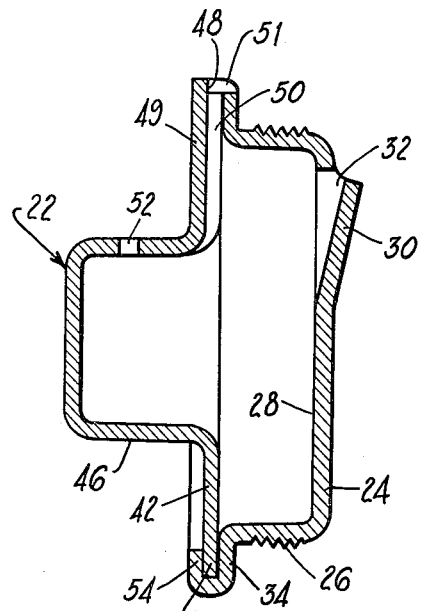
Figure 7:
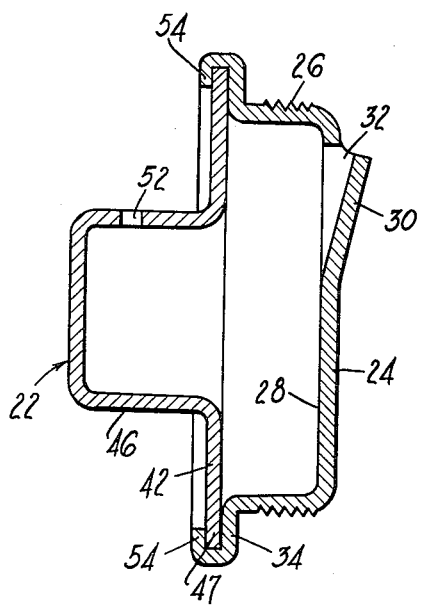

FIGURES 5, 6, and 7 are section views of various modifications of the filler cap construction.

Although my invention may be used with any suitable fluid container, I have shown it embodied as a filler cap for a master cylinder reservoir.

The invention may be used with a conventional master cylinder 10 having a cylinder bore 12 and piston 14 reciprocable therein. The master cylinder has the usual hydraulic reservoir 16 and compensating port 17 which leads to the cylinder bore 12. It will be noted that the port is unobstructed by the piston or sealing cap when it is fully retracted. A breather port 18 may also be provided to permit fluid movement from the cylinder to the reservoir during reciprocation of the piston 14.

The reservoir 16 is formed with a threaded opening 20 at the upper portion thereof; this opening serves as an inlet through which fluid is poured to replenish the hydraulic fluid supply in reservoir 16. A removable filler cap 22 is screwed in the threaded opening 20 and is thus fixedly secured therein. The filler cap 22 includes a plug 24 having threads formed on the outer periphery.

The closed end 28 of the plug 24 has struck portions 30 which provide breather openings 32. The one end of the plug is bent outwardly to form a shoulder 34. The closed end 28 of the plug 24 has depressions extending radially outwardly so that the outer periphery of the base or closed end 28 is at a lower level than the central portion when the filler cap 22 is screwed into the threaded opening 20 of the master cylinder 10. These depressions, serve the purpose of redraining fluid back into the reservoir 16 should any fluid splash upwardly and enter the filler cap 22.

In some applications of the invention, I find it desirable to provide a baffle 36. The baffle 36 is positioned against one side of the shoulder 34 and includes a centrally located conical portion 38 having an opening 40 in the uppermost part thereof.

Figure 3:
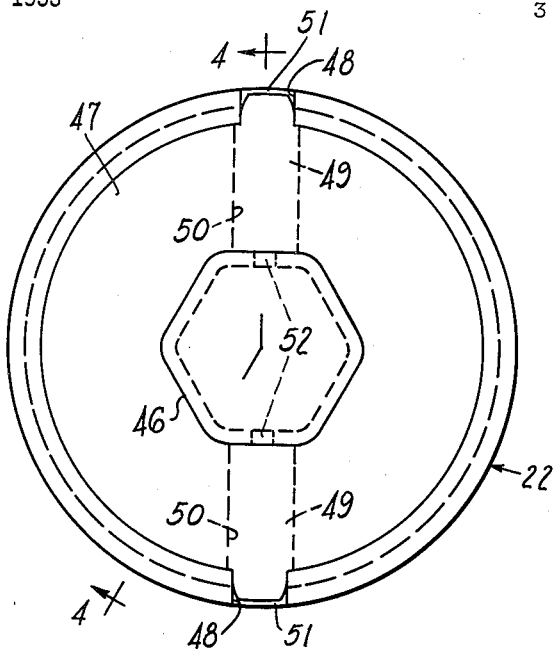
FIGURE 3 is a top view of the master cylinder cap shown in FIGURE 2.

A cap 42 is positioned against baffle 36. The cap 42 has irregularly shaped sides 46 (FIGURE 3) which facilitate gripping of the cap by a tool which is suitable for turning the cap. A flat skirt 47 on the cap 42 lies against the baffle 36. The skirt 47 has two ridges 49 (FIGURE 3) which are embossed therein; the ridges 49 extend through slots 48 which are formed in the crimped over end of the plug 24. These ridges 49 contact the edges of the slots 48 to form a drivable connection between the cap and the plug.

Figure 4:
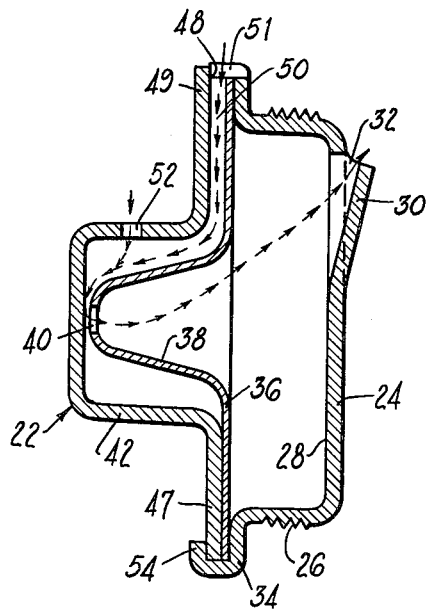
FIGURE 4 is a section view taken on the line 4—4 of FIGURE 3.

It will be noted in FIGURE 4 that the ridges 49 form passages 50 which terminate in openings 51. The purpose of these passages 50 is to permit drainage of water or other entrained material which accompanies incoming air passing into the reservoir. A plurality of apertures 52 are located in the cap 42 to vent air into the reservoir in the direction and manner indicated by arrows in FIG- URE 4. Air can enter the system not only by way of the apertures 52, but also by way of passages 50. As a precaution, however, I do not rely solely on the passages but also provide the vents 52, since there is a possibility that the passages could become clogged by foreign matter to prevent passage of air into the reservoir via the filler cap. Air would then be sucked into the system via the piston seals and the entrained air bubbles bring about faulty pedal performance.

Figure 1:
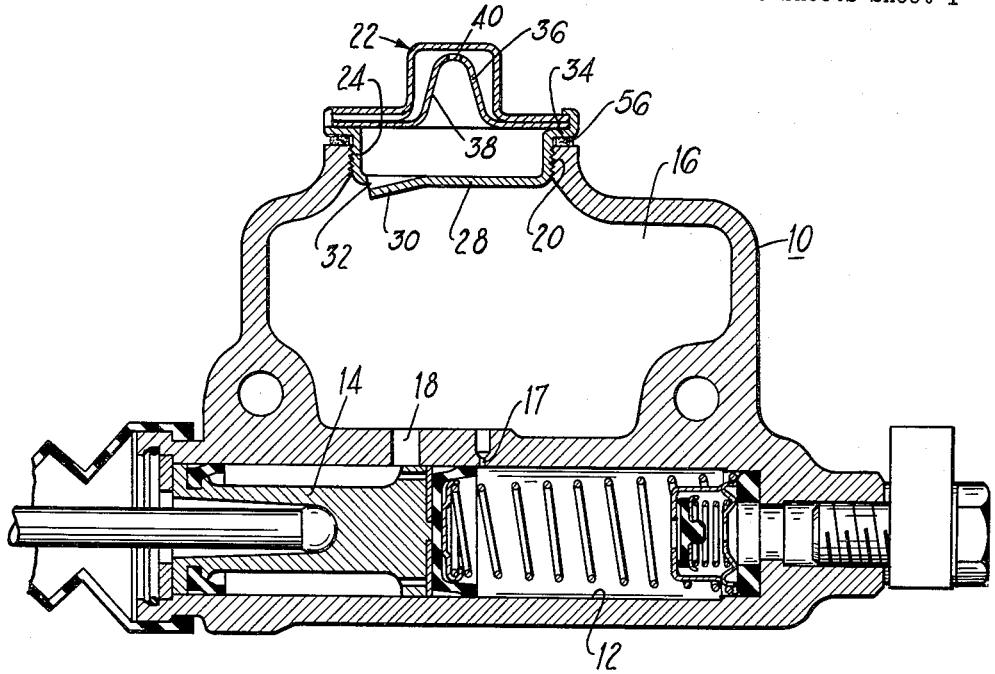
FIGURE 1 is a section view of a master cylinder having the filler cap provided therein, the section being taken through the longitudinal axis of said master cylinder.
Figure 2:
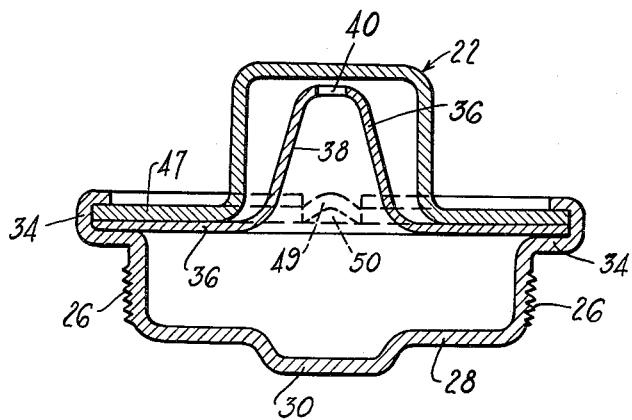
FIGURE 2 is an enlarged detail view of a removed filler cap, shown in side elevation.

The end of the plug 25 is crimped over at 54 to hold the cap 42 and baffle 36 against the one side of the shoulder 34 (FIGURE 4). An O-ring seal 56 engages the other side of shoulder 34 to seal the threaded opening 20 (FIGURE 1).

It is an important feature of the invention that the air which is vented to the reservoir through vents 52 does not contaminate the hydraulic fluid with water and/or other foreign material. For this reason the incoming air indicated by the arrows in FIGURE 4 is given a change of direction through the baffle 38. Any foreign material then drops between the baffle 38 and the filler cap 42 and is expelled through passages 50 and openings 51. Venting of air is thus accomplished without contaminating the hydraulic fluid.

A further feature of the invention is that of preventing escape of hydraulic fluid from the reservoir through the filler cap. The closed end 28 of the plug acts as a barrier preventing escape of hydraulic fluid due to splashing within the reservoir. If hydraulic fluid should find entrance into the filler cap, baffle 36 prevents loss of fluid from the filler cap. Also, fluid which splashes up into the filler cap will redrain into the reservoir through the openings 32 in the closed end of the plug.

One of the principal advantages which I claim for the invention is that the filler cap reliably confines the fluid to the reservoir and yet effectively accomplishes venting of air into the reservoir without objectionable entrance of extraneous material accompanying this air venting.

It will be further noted that each of the components of the filler cap consists of a stamped part. This makes for economy of manufacture. It is very simple to make and assemble the device; all that is necessary is positioning the cap with respect to the plug and then crimping the edge 54 to secure the parts together.

It has been my experience that, in use of master cylinder filler caps, a great deal of torque is exerted on the cap in installing and removing it from the opening in the master cylinder. This oftentimes results in loosening the connection between the cap and the threaded plug which is received in the opening of the master cylinder. If this happens, it is extremely difficult to remove the plug without breaking the reservoir. In the present invention, this possibility is completely obviated. The solution is that a drivable interconnection is provided between the cap and plug which prevents any relative turning therebetween. It is not possible to loosen the cap with respect to the plug as a consequence of normal wear.

It is not a necessary part of the invention that there be provided a drivable connection between the plug and cap. The construction may be simplified to the extent of eliminating both the baffle and the drivable connection and fitting the plug and cap together by simply crimping the open end of the plug over the cap. These two parts then constitute the only components of the filler cap. The end of the plug is folded back and over the periphery of the plug. Referring to FIGURE 7, it will be noted that cap 22 and plug 24 constitute the only two parts of the assembly. The plug has threads 26 which are press formed in the outer surface of the plug; the closed end 28 has struck segments 30 which prevent fluid from splashing out of the hydraulic reservoir. These struck portions do permit fluid to redrain into the reservoir if any fluid should be jarred upwardly into the interior of the cap.

With the construction in FIGURE 7, the plug and cap are held together frictionally, owing to the press fit between the folded edge 54 of the plug and the flat skirt 47 of the cap.

FIGURE 5 illustrates a filler cap construction differing from that shown in FIGURE 4 by elimination of the drivable connection between ridges 49 and the edges of slots 48.

FIGURE 6 shows a filler cap construction differing from that shown in FIGURE 4 by elimination of baffle 36.

A final feature of the invention which is evident from considering all of the embodiments, is that the construction of the filler cap lends itself to manufacture within close tolerances, thus enabling size standardization. This is an important consideration because the filler cap can be mass produced for use in hydraulic equipment.

I am aware that various modifications of the invention can be made without departing from the principles thereof, and intend therefore to include within the scope of the following claims, all equivalent structures through which the same or equivalent results of the invention may be obtained.

I claim:

1. A removable filler member for a master cylinder, comprising a threaded cylindrical plug having the end thereof turned outwardly to form a circular shoulder providing a seat for said filler member, said cylindrical plug being provided with an end closure having struck portions forming openings therein, a cap consisting of a flat circular base and a boss with the sides thereof formed as flats to facilitate turning of said cap, said boss being formed centrally of said base, a plurality of elongated protuberances formed integrally with said base and extending through peripherally formed slots in the open end of said plug to form a drivable connection therebetween, a baffle having a flat annular portion positioned between the circular base of said cap and the shoulder of said plug, said baffle being further provided with a projection which extends into the boss of said cap, and has at least one opening permitting air to flow through openings in said cap into the master cylinder reservoir.

2. A removable filler member for a master cylinder reservoir, comprising a threaded plug having an end closure with struck portions providing breather openings and shields to prevent splashing of fluid within said filler member, a cap having an annular base and a centrally located boss with irregular sides adapted for cooperation with a tool for producing turning of said cap, means forming an interlocking drive connection between said plug and cap wherein portions of said annular base are projected through slots in the periphery of said plug whereby turning of said cap imparts turning of said plug, and a second baffle mounted between said cap and plug and having at least one opening therein which cooperates with openings in said cap to vent air into the reservoir of the master cylinder.

3. A removable stopper for a master cylinder reservoir comprising a threaded plug having an annular shoulder, a cap provided with a circular perimeter engaging the shoulder on said plug, a first baffle formed integrally in said plug from struck portions in the bottom of said plug, a centrally located boss on said cap having irregular sides facilitating turning of said cap, means forming a drivable interlocking connection between said cap and plug wherein a portion of said cap is projected through notches in the outer periphery of said plug to form a positive interconnection preventing relative turning therebetween, and a second baffle located intermediate said cap and plug, the open end of said plug being crimped over said second baffle to clamp the inner periphery of said cap against the shoulder of said plug.

4. A removable stopper for a master cylinder reservoir, comprising a threaded cylindrical plug having a closed end with slots therein, a shielding portion of said closed end formed adjacent each of said slots to prevent fluid from entering said stopper, a cap mounted on said plug, means forming a drivable interconnection between said cap and plug and comprising protuberances formed in said cap projected through slots in the outer periphery of said plug, a centrally located boss on said cap with irregularly formed sides facilitating turning of said cap, and a second baffle located intermediate said plug and cap, the open end of said plug being bent outwardly to form a shoulder and then crimped over to hold said cap second baffle in contact with the shoulder on said plug.

5. A removable stopper for a master cylinder reservoir, comprising a threaded plug having a closed end with struck portions therein, integral shielding means in said plug adjacent each said openings to exclude fluid from said master cylinder reservoir, a cap inclusive of an annular flat base, means forming protuberances on said annular base received through slots in the outer periphery of said threaded plug to provide a positive drivable connection preventing relative turning therebetween, and a centrally projecting boss having irregular sides to facilitate turning of said cap, a plurality of vents in said cap providing air passage into said reservoir, the open end of said plug being bent outwardly and then crimped over to hold said cap and plug operatively together.

References Cited in the file of this patent

UNITED STATES PATENTS

| | | |
|---|---|---|
| 1,082,892 | Milligan et al. | Dec. 30, 1913 |
| 1,382,598 | Kelly | June 21, 1921 |
| 1,690,804 | Wikstrom | Nov. 6, 1928 |
| 1,934,356 | Kice | Nov. 7, 1933 |
| 2,167,654 | Hothersall | Aug. 1, 1939 |
| 2,248,417 | Shepard | July 8, 1941 |
| 2,258,019 | Kramer et al. | Oct. 7, 1941 |
| 2,816,681 | Taylor | Dec. 17, 1957 |

FOREIGN PATENTS

| | | |
|---|---|---|
| 176,307 | Great Britain | Mar. 30, 1922 |
| 179,097 | Great Britain | May 4, 1922 |
| 389,592 | Great Britain | Mar. 23, 1933 |
| 494,076 | Belgium | Mar. 15, 1950 |